US006261453B1

(12) United States Patent
Savage

(10) Patent No.: US 6,261,453 B1
(45) Date of Patent: Jul. 17, 2001

(54) FLUID TREATMENT MEDIA SUPPORT SYSTEM

(75) Inventor: E. Stuart Savage, Brunswick, ME (US)

(73) Assignee: Tetra Process Technologies, div. Capital Controls Company, Inc, Tampa, FL (US)

( * ) Notice: Subject to any disclaimer, the term of this patent is extended or adjusted under 35 U.S.C. 154(b) by 0 days.

(21) Appl. No.: 09/176,147

(22) Filed: Oct. 21, 1998

Related U.S. Application Data

(63) Continuation of application No. PCT/US97/06800, filed on Apr. 24, 1997.
(60) Provisional application No. 60/017,052, filed on Apr. 26, 1996.

(51) Int. Cl.[7] .............................. B01D 24/22; B01D 24/46
(52) U.S. Cl. ............................................. 210/274; 210/293
(58) Field of Search ................................. 210/274, 289, 210/291, 293, 541, 498, 510.1, 490

(56) References Cited

U.S. PATENT DOCUMENTS

| | | |
|---|---|---|
| 667,005 | 1/1901 | Davis . |
| 1,891,061 | 12/1932 | Friend et al. . |
| 2,263,964 * | 11/1941 | Camp .................................. 210/293 |
| 2,267,918 | 12/1941 | Hildabolt .............................. 29/189 |
| 3,178,026 * | 4/1965 | Christy ................................ 210/293 |
| 4,564,450 * | 1/1986 | Piper et al. .......................... 210/293 |
| 4,783,261 * | 11/1988 | Lingle ................................ 210/291 |
| 4,882,053 | 11/1989 | Ferri ................................... 210/293 |
| 5,149,427 | 9/1992 | Brown et al. ........................ 210/274 |
| 5,154,827 * | 10/1992 | Ashelin et al. ...................... 210/490 |
| 5,232,592 | 8/1993 | Brown et al. ........................ 210/274 |
| 5,468,273 | 11/1995 | Pevzner et al. ........................ 55/523 |

FOREIGN PATENT DOCUMENTS

| | | |
|---|---|---|
| 0541011 | 9/1921 | (FR) . |
| 2554009 | 10/1983 | (FR) . |

OTHER PUBLICATIONS

Feb., 1994, Jrn. AWWA, 73–78, Water Technology, Deep Bed Filtration.

* cited by examiner

*Primary Examiner*—Ivars Cintins
(74) *Attorney, Agent, or Firm*—Jo Katherine D'Ambrosio

(57) ABSTRACT

A filter media support system that reduces media clogging and head loss in granular filtration systems by providing a layered porous plate. The porous plate can have multiple layers of fine sized and coarse sized pores. The porous plate is positioned between the media and the filter bottom. The filter media support system is securely anchored to the infrastructure of the underdrain system thereby inhibiting media penetration of the filter bottom and avoiding seal failures. The infrastructure can be air lateral piping fitted beneath the underdrain blocks of the support system. The anchors can be secured to pipe clamps circumscribing the air laterals.

16 Claims, 4 Drawing Sheets

FLUID TREATMENT MEDIA SUPPORT SYSTEM

CROSS REFERENCES TO RELATED CASES

This is a continuation of U.S. Provisional Patent Application, Ser. No. 60/017,052 filed Apr. 26. 1996, now abandoned, and International Application No. PCT/US97/06800, filed Apr. 24,1997.

FIELD OF THE INVENTION

The present invention relates to a fluid treatment media support system for granular filters. More specifically the invention relates to a fluid treatment media support system using a porous plate, a layered porosity pattern in the porous plate, and an anchoring system for the porous plate. The fluid treatment media supported by the system of this invention can be a filtration media or other media such as an ion exchange resin.

BACKGROUND OF THE INVENTION

Water, wastewater and industrial liquid granular filtration units typically have a filter media support system that separates the filter media from the underdrain system and filter bottom. The underdrain system is the primary support for the filter media, and also serves to collect the filtrate and provide for the uniform distribution of air and water during the backwash of the filter system.

Underdrain systems are often made of concrete blocks having spaces to allow for piping, such as air laterals, that are part of the backwash air distribution system. A precast concrete, plastic-jacketed underdrain block is disclosed in U.S. Pat. No. 4,923,606. Nozzle-less type underdrain systems with large openings for the passage of the filtrate and the backwash water are preferred because they do not plug as easily as nozzle type underdrains. Because the openings in nozzle-less underdrains are larger than the size of the individual grains of the media, however, it is necessary to use a media support system between the underdrains and the media.

A media support system serves several purposes that are conflicting. For example, very fine media, such as 0.1 to 0.5 mm sand, may be used in potable water type filters. Consequently, a very fine media support is needed to separate this media from the underdrain system and filter bottom and prevent plugging and loss of filter media. Plugging of the underdrain system filter bottom causes a loss of the filtering capacities of the bed and downtime of the filter system. However, large or coarse-pore media support is necessary to promote the formation of larger air bubbles which are desired because they wash a filter better than fine bubbles of air. Jung & Savage, *Deep Bed Filtration*, Journal American WaterWorks Association, February, 1974, pp. 73–78.

Two types of media support systems have been in common use: (1) support gravel beds comprised of graded gravel placed between the filter media and the filter bottom (or underdrain system) and (2) uniformly porous plates that are anchored to the side walls of the filter or to the underdrain blocks.

When layered gravel beds are used for media support systems, the bed of gravel is usually 12 to 18 inches in height with several layers of varying size gravel. The layers of gravel adjacent to the media and filter bottom are usually coarse and the intermediate layer or layers smaller or finer in size. The finer intermediate gravel layer inhibits the penetration of the media to the underdrain blocks. The coarser gravel in the top or cap layer, however, inhibits plugging of the fine gravel layer. If the finer media penetrates the gravel layers during filtration, it accumulates in the cap layer and is then washed out during the backwash cycle of the filtration process.

U.S. Pat. No. 1,787,689 to Montgomery and U.S. Pat. No. 1,891,061 to Friend et al., for example, disclose a water treating tank containing zeolite water softeners. The gravel beds of the tanks are arranged in an hourglass configuration with layers of coarser and finer gravels.

Gravel layers have several disadvantages including difficulty in installation, the need for deeper filter boxes to allow for the depth of the gravel and higher costs. Also, the gradation of the gravel layers tends to be disturbed during the filtration and backwashing processes and downtime may be required to restore the desired gradation.

Porous plates have been used to replace gravel layers. Porous plates are typically manufactured from sintered plastics. Plastic porous plates, however, are usually buoyant and need to be secured in some way to prevent lifting, especially during the backwash cycle. Prior art methods of securing the porous plate include a combination of screwing and caulking or grouting the plate to the underdrain blocks as disclosed in U.S. Pat. No. 5,149,427 to Brown, or bolting the plate to the underdrain blocks.

U.S. Pat. No. 4,882,053 to Ferri discloses a porous plate used in a filter system without underdrain blocks; the porous plate is attached by a retaining angle secured to each wall of the filter box. The retaining angle holds the plate in place and a seal is made by a sealant bead applied between the side walls and the porous plates.

Problems arise with the above-referenced methods of anchoring the porous plates. Small irregularities in the floor of the filter, the underdrain blocks and the plates can cause seal failures between the plates. Seal failure allows media to penetrate the media support system, causes a progressive failure of the filter underdrain and then of the filter system itself. The underdrains, effluent piping, and clearwell may become plugged with media and the filter bottom may collapse due to excessive pressures which develop during backwash.

U.S. Pat. Nos. 5,149,427 and 5,232,592 to Brown disclose a cap for filter underdrain blocks comprising a porous, planar body. The body of the cap is said to be adapted to support a fine grain filter media without the media penetrating therethrough. The pores in the cap body are approximately 700–800 microns in size.

U.S. Pat. No. 4,882,053 to Ferri, mentioned above, discloses a support or drain plate for filter media comprising porous heat-fusible polyethylene in a traveling bridge filter. The porous drain plates have narrow heat fused, non-porous bands extending vertically through the plates. These bands provide rigidity to the plates said to decrease bowing and subsequent channeling of water during backwash experienced with lap joints. However, the non-porous bands would tend to reduce permeability during filtration and increase head loss.

U.S. Pat. No. 667,005 to Davis discloses a filter bottom for a granular bed that includes three sheets or layers of wire cloth. The upper layer and lower layer are coarse with the intermediate layer being a fine mesh. U.S. Pat. No. 2,267,918 to Hildabolt discloses a porous article formed from metal powders and having plural layers of different porosity. U.S. Pat. No. 5,468,273 to Pevzner et al. discloses a nickel-based filter material having three strata of different porosity used for removing contaminants from air.

SUMMARY OF THE INVENTION

The filter media support system of the present invention reduces media clogging and head loss by providing a layered porous plate having multiple layers of fine sized and coarse sized pores. The filter media support system further provides an anchor for securely anchoring the porous plate to the infrastructure of the filter bottom, thereby inhibiting media penetration to the filter bottom and avoiding seal failures.

In one aspect, the present invention provides a system for supporting granular filter media above a filter bottom. The system has a porous plate which is placed over the filter bottom to support the filter media. The porous plate includes adjacent layers of different porosity. Preferably, the porous plate includes a relatively coarse pore size layer adjacent to the filter bottom, and a relatively fine pore size layer above the coarse pore size layer. If desired, the porous plate can also include a relatively coarse pore size layer above the fine pore size layer. The coarse layer preferably has a pore size of from 500 to 5000 microns, and the fine layer preferably from 150 to 1500 microns.

The porous plate is preferably supported on a layer of underdrain blocks on the filter bottom. The porous plate preferably has a larger horizontal dimension than that of the individual underdrain blocks. In this manner, a plurality of underdrain blocks support the porous plate. The porous plate can be anchored to air laterals beneath the underdrain blocks, or other infrastructure. The porous plate preferably comprises sintered polyethylene, although it could also be made from ceramics, metals, polymers and the like. The porous plate preferably includes lap joints between adjacent sections.

In another aspect, the present invention provides a filter which has upright walls defining at least one compartment housing granular filter media supported above a filter bottom on the porous plate with the layers of different porosity just described.

In a further aspect, the present invention provides a filter system for supporting granular filter media above a filter bottom which has a layer of underdrain blocks placed over infrastructure of the filter bottom. A porous plate is placed over the underdrain blocks to support the filter media. Anchors extend from the porous plate through the layer of underdrain blocks to secure the porous plate to the infrastructure. The infrastructure can include a plurality of air laterals running beneath the underdrain blocks, and the anchors are preferably secured to the air laterals. The underdrain blocks are preferably arranged end-to-end in rows over the air laterals and the porous plate preferably has a larger horizontal dimension than the individual underdrain blocks. In this manner, the porous plate covers a plurality of the underdrain blocks, and the anchors can extend between adjacent ends of the blocks.

The upper ends of the anchors are preferably secured to bars positioned over the porous plate which run transversely to the rows of the underdrain blocks. The porous plate can include lap joints parallel to the rows of underdrain blocks. The anchors preferably pass through a bore formed through an overlap of the joint between adjacent porous plate sections. The sides of adjacent underdrain blocks are preferably interconnected by lugs.

Yet another aspect of the invention is a filter having upright walls defining at least one compartment housing granular filter media supported above a filter bottom which includes a porous plate anchored to the infrastructure of the filter bottom as just described.

DETAILED DESCRIPTION OF THE INVENTION

Figure 1:
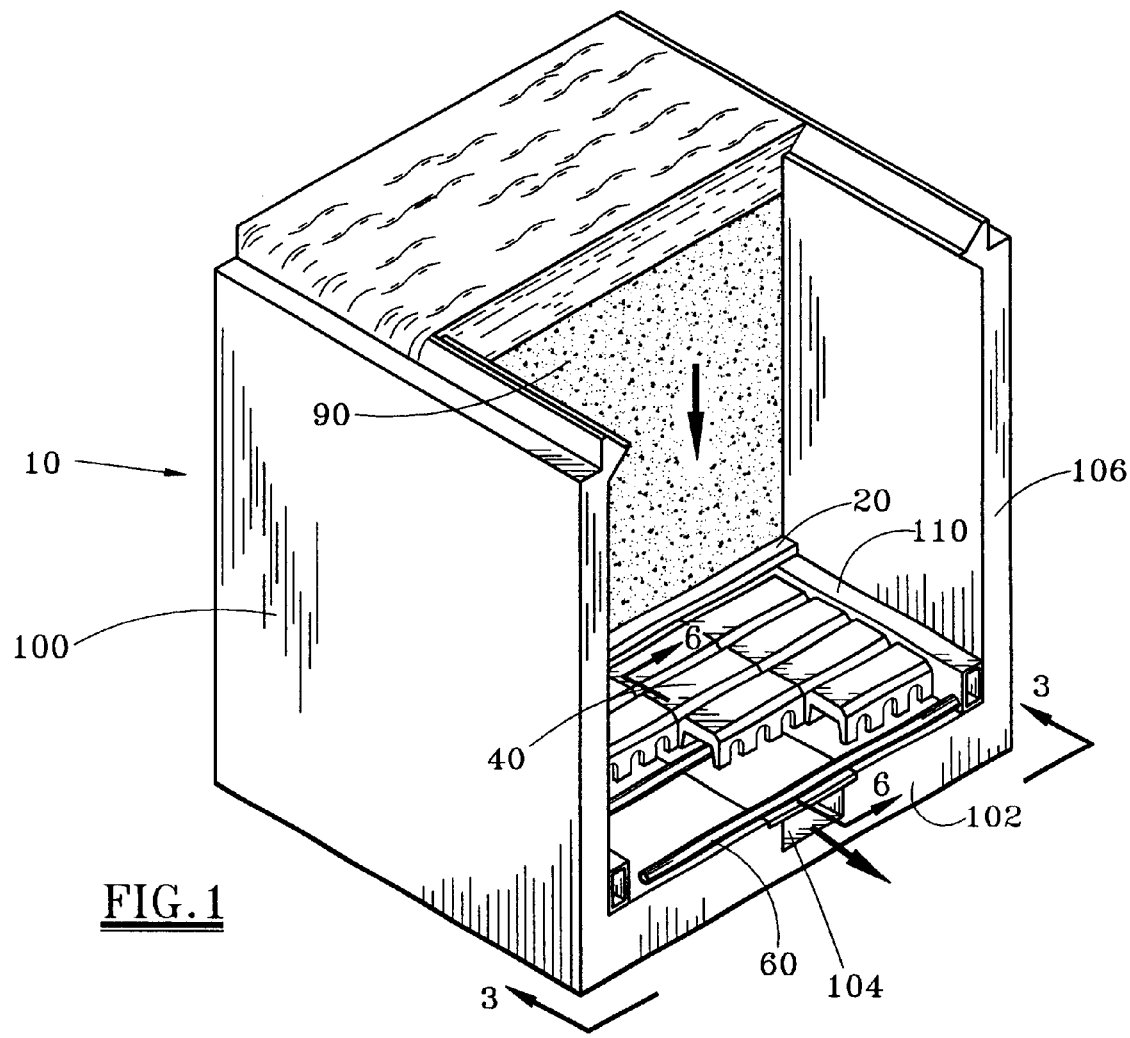
FIG. 1 is a perspective view, partially cut away, of a section of the filtration system illustrating the filter media support system according to one embodiment of this invention.

The filter media support system of this invention is directed to a porous plate, preferably of graded porosity, and a system for securely anchoring a porous plate to the structural support of the underdrain system. FIG. 1 illustrates a section of a filtration system 10 and a porous plate 20 securely anchored within that system 10. Filtration system 10 is usually used to filter water, including potable water and wastewater and can also be used for ion exchange or other absorption processes. The filtration system 10 has a filter box 100 containing granular media 90, such as sand, anthracite, or activated carbon, ion exchange resin, or the like, or a combination thereof. Filter influent flows into the filter box 100, through the media 90 and drains through the underdrain system 50 to the bottom of the filter box 102 where it collects in a sump 104.

Figure 2:
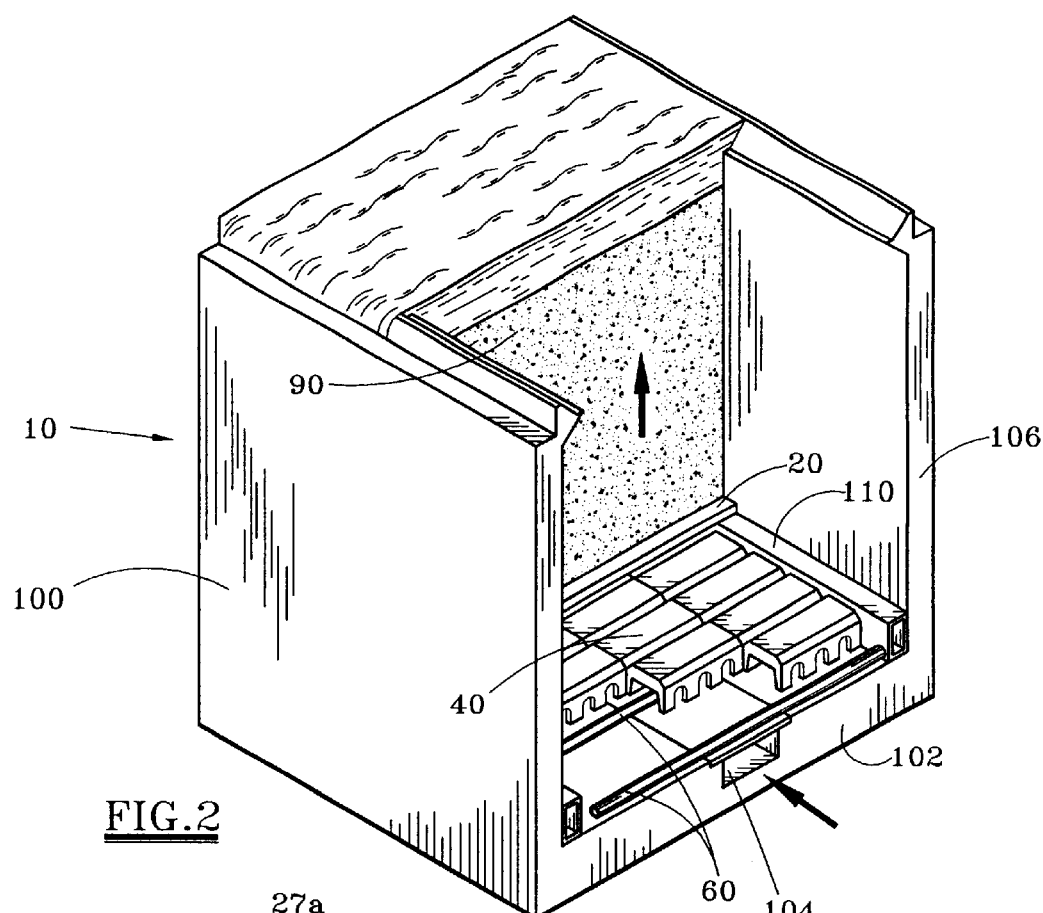
FIG. 2 is a perspective view of a section of the filtration system illustrating the backwash flow through the filter media support system of FIG. 1.

During the backwash phase of the filtration cycle, normal downward filtration stops and an upflow of liquid, usually water, and gas, usually compressed air, cleanse the filter system. As seen in FIG. 2, backwash water from backwash pumps (not shown) is pumped into the sump 104 and through the filter system 10. Backwash air is supplied via headers 110 located on either side of the filter box 100, and through air laterals 60 into the filter system 10.

Figure 5:
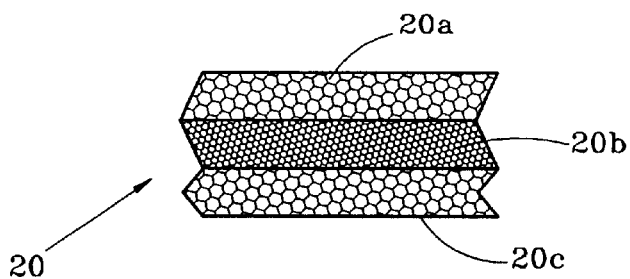
FIG. 5 is a perspective view, partially cut away, of the layered porosity plate according to one embodiment of this invention.

The porous plate 20 is positioned between the media 90 and the underdrain blocks 40, thereby supporting and separating the filter media 90 from the underdrain system 50. As illustrated in FIG. 5, the porous plate 20 has a reverse gradation of coarse and fine pore layers. In a preferred embodiment of the invention, a relatively coarse pore layer 20c is adjacent the underdrain blocks 40 and another relatively coarse pore layer 20a is adjacent the filter media 90. A relatively fine pore layer 20b lies between the two coarse pored layers 20a, 20c. Varying size pores are beneficial in media support systems. A fine pore layer 20b is necessary to separate fine media 90, 0.1 to 0.5 mm sand for example, from the underdrain system. The fine pore layer 20b prevents clogging of the underdrain system 50 and loss of filter media 90. The coarse pore layer 20c of the porous plate 20 promotes the formation of large air bubbles which wash the filter system better than fine air bubbles. Also, if any media penetrates the porous plate 20 during the filtration cycle, it will accumulate in the top coarse pore layer 20a and is readily washed out during the backwash cycle.

In a preferred embodiment, the pore size of the coarse layers 20a, 20c range from 500 to 5000 microns. The pores in the fine pore layers range from 150 to 1500 microns.

The porous plate 20 of this invention may be manufactured from ceramics; metals, particularly sintered metals such as nickel, titanium, stainless steel and the like; and polymers, such as polyethylene, polypropylene or polystyrene; or any suitable material. In a preferred embodiment, the material is a sintered polyethylene. The porous plate 20 can be formed by sintering heat-fusible particles to the desired shape. Other heat-fusible materials may be used such as polypropylene or the above referenced group of materials. The porous plate 20 can include different adjacent layers of different porosity fused integrally together, or the layers can be formed by stacking sheets of different porosity together where each sheet corresponds to a specific porosity layer.

The length and width of the porous plates 20 may vary according to the size of the underdrain blocks 40 or bottom of filter box 102. In a preferred embodiment, the porous plate 20 has a larger horizontal area or dimension than the individual underdrain blocks 40 so that the porous plate 20 covers a plurality of underdrain blocks 40. In another preferred embodiment, the porous plates have widths in multiples of the width of the underdrain blocks 40. The preferred thickness of the porous plate 20 varies from 1 inch or less to 2 inches or more, depending on the particular application.

Figure 4:
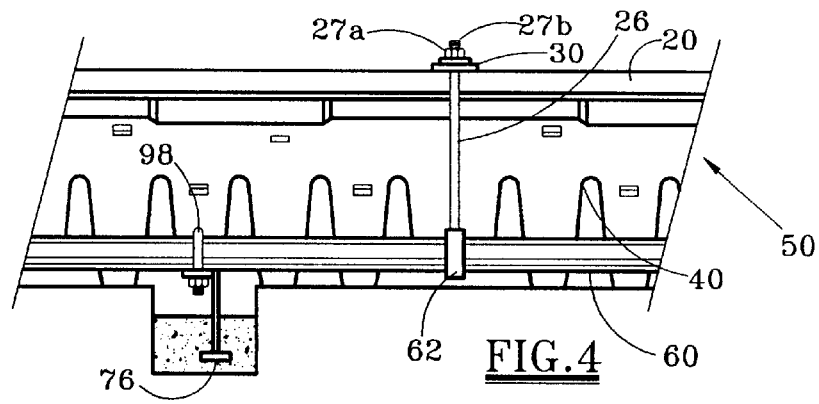
FIG. 4 is an enlarged view of a section of FIG. 3.
Figure 7:
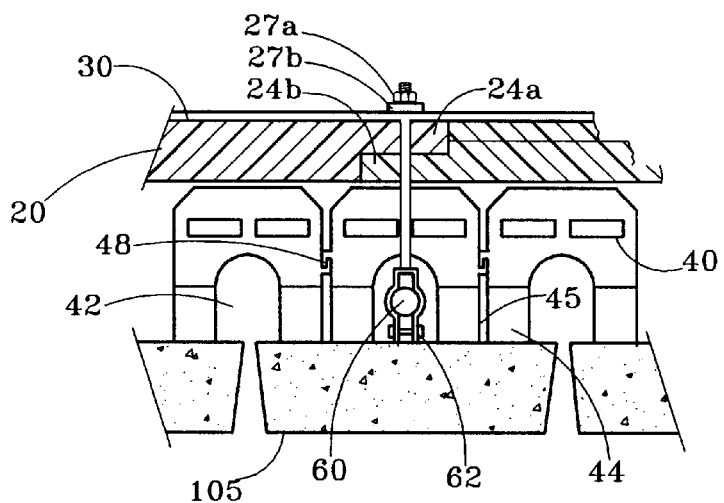
FIG. 7 is an enlarged view of a section of FIG. 6.
Figure 8:
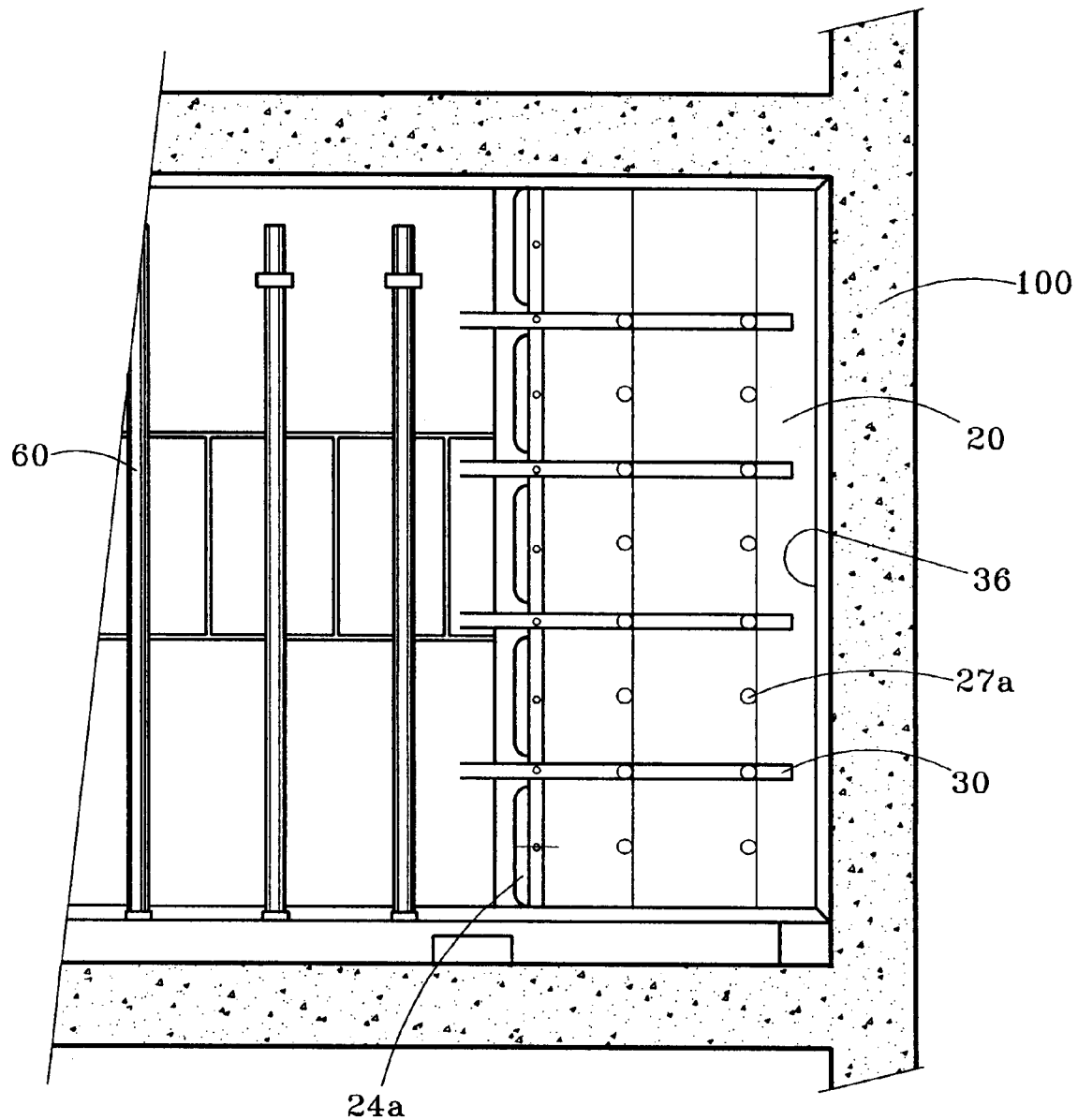
FIG. 8 is a plan view of the filter media support system of FIG. 1.

A porous plate 20 manufactured from sintered polymers tends to be buoyant and float. FIGS. 4 and 7 illustrate the improved anchoring of the porous plate 20 of one embodiment of this invention. The porous plate 20 is secured to the infrastructure 60 of the bottom of filter box 102 rather than the side walls 106 of the filter box 100 or underdrain blocks 40 as done in the prior art media support systems. Anchoring the porous plate 20 to the infrastructure 60 improves the seal to prevent lifting and bowing, especially during the backwash cycle.

Figure 6:
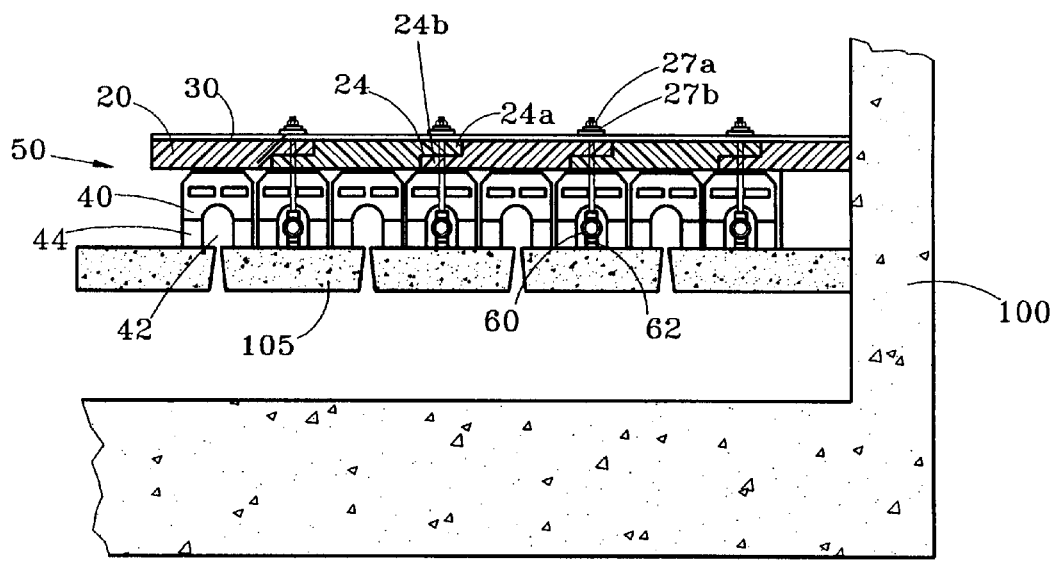
FIG. 6 is a cross-section of the filter media support system of FIG. 1 taken along lines 6—6.

In a preferred embodiment of this invention, the porous plate 20 is anchored to the air lateral piping 60 which supplies the backwash air. The air laterals 60 are run in spaces 42 between block legs 44 of the underdrain blocks 40. An air lateral 60 can be placed between the legs 44 of every other row of blocks 40. A preferred underdrain block 40 is described in U.S. Pat. No. 4,923,606 the disclosure of which is hereby incorporated by reference in its entirety. Briefly, as best seen in FIGS. 6 and 7, the underdrain blocks 40 are arranged end-to-end in rows over the air laterals 60, and the sides of adjacent underdrain blocks 40 are interconnected by lugs 48. Preferably, the porous plate 20 has a larger horizontal area than the individual blocks 40 so that the porous plate 20 covers a plurality of the underdrain blocks 40. Anchors 26 extend from the porous plate 20 between adjacent ends of the blocks 40 to the air laterals 60. An indentation (not shown) is preferably formed in the opposing ends of the adjacent blocks 40 to accommodate the cross-section of the anchors 26. Alternatively, the anchors 26 could extend directly through an aperture formed in the blocks 40 to an attachment point on the bottom of filter box 102.

Preferably, the upper ends of the anchors 26 are secured to bars 30 positioned over the porous plate 20. The bars 30 preferably run transversely to the underdrain blocks 40 and help to hold the porous plates securely in place. This inhibits bowing or lifting of the porous plate 20. Suitable bars 30 are manufactured of a corrosion-resistant metal such as stainless steel and are approximately 2 inches in width and ¼ inch in depth. The preferred anchor 26 is a threaded rod manufactured from a corrosion-resistant metal such as stainless steel. The anchor 26 is secured to the porous plate 20 by a fastener, preferably a nut 27a and an oversized washer 27b. Additional sealants may be used to prevent leakage in the bore through the plate 20 around the rod 26.

Figure 3:
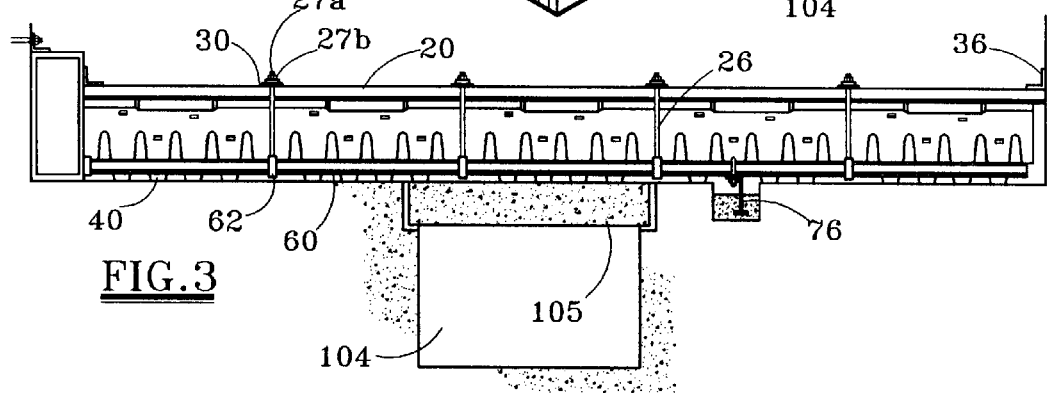
FIG. 3 is a cross-section of the filter media support system of FIG. 1 taken along lines 3—3.

FIG. 6 illustrates sections of the porous plate 20 joined together by overlapping the ends of adjacent sections of the porous plate 20 at lap joints 24. The lap joints 24 run parallel to the rows of underdrain blocks 40. The anchors 26 pass through the bar 30, through the porous plate 20 by means of a bore in the lap joints 24 and between the underdrain blocks 40, and are secured to the air laterals 60. Preferably, the anchors 26 are secured to the air laterals 60 by pipe clamps 62 circumscribing the air laterals 60 as illustrated in FIGS. 4 and 7. Lateral support angles 76 grouted into the bottom of filter box 102 can provide additional support for the air laterals 60. As depicted in FIG. 3 support brackets 36 can also be used, if desired, to secure the porous plate 20 to the walls of the filter box 100.

The porous plate 20 of the present invention may be installed in new filtration systems or retrofitted into existing systems. A filter box 100 having side walls 106 and a bottom 102 is constructed conventionally with an infrastructure 50 of air lateral piping 60 across the bottom of filter box 102 and a sump 104 and sump cover plate 105 for collection of filtrate during the filtration process and for the supply of backwash water during backwashing operations. Pipe clamps 62 are placed around the air laterals 60 and anchors 26 secured to the pipe clamps 62. The underdrain blocks 40 are arranged in rows over the air laterals 60 so that the air laterals 60 lie in spaces 42 between the block legs 44 with an air lateral 60 under every other row of blocks 40. The blocks 40 are spaced apart to create a gap 45 which provides for air and water flow. The anchors 26 extend upward between the blocks 40. The beveled configuration of the top of the blocks 40 creates a channel into the gap 45. The blocks 40 can be interconnected with lugs 48 sized to provide the desired size of gap 45. Additional sealing can be provided by grouting the perimeter blocks 40 to the filter box 100. The blocks 40 should be of a weight to resist lifting and shifting, especially during the backwash phase but not so heavy as to prohibit easy handling.

After the underdrain system is in place, the sections of the porous plate 20 are placed over the rows of blocks 40 and joined by lap joints 24 which run parallel to the blocks 40. Bores, preferably pre-formed, pass through the upper lips 24a and lower lips 24b of the adjacent sections of the porous plate 20 for receiving anchors 26 extending upwards from the rows of blocks 40, thereby improving the seal of the lap joints 24. A stainless steel bar 30, running transversely to the blocks 40, is placed over the lap joints 24. The anchors are then secured by nuts 27a and washers 27b. Larger sheets of porous plate 20 can be made by further sealing the lap joints 24 by means of mastic, epoxy glues or thermal welding; however, this should be avoided as much as possible to minimize decreasing the permeability of the porous plate 20. The anchors 26 thus extend through the bar 30, through the bores in the lap joints 24, between the underdrain blocks 40 and are secured to pipe clamps 62 circumscribing the air laterals 60.

After the filtration media support system is in place, filter media 90 may be installed and operation of the filtration cycle initiated as the filter influent flows into the filter box 100. Periodically, the filtration process may be stopped so that the filtration system may be backwashed.

The anchors 26 of the present invention securely hold the porous plate 20 to the air laterals 60, thereby reducing lifting and bowing that is induced especially by the pressures exerted during the backwash cycle. The graded porosity layers of the plate 20 create larger air bubbles during the backwash cycle which wash the filter system better than fine bubbles, and yet provide fine pores for inhibiting media particles 90 from entering the underdrain system 50 during the filtration cycle.

EXAMPLE

Air spreading tests are performed to observe and record the impact of the reverse-gradient porous plate of this invention on backwash air distribution. During the first test, a 600–700 micron ¾-inch thick porous plate is put in place. Underdrain blocks, specifically 8-inch wide T-blocks are installed in the test column, the column is filled with water up to the overflow weir and backwash air added at a rate of 2.0 CFM/ft$^2$. The test is repeated at air rates of 4.0 CFM/ft$^2$ and 6.0 CFM/ft$^2$. A standard is used to measure the size of the air bubbles. The results are photographed and data recorded. An uneven air pattern occurs during the backwash and the air bubbles are relatively small.

The tests are repeated with the layered porosity porous plate in place at the same three air rates. The porous plate has coarse-pore layers of about ⅜-inch thickness having a pore size of approximately 600 microns and an intermediate fine-pore layer of about ⅜-inch thickness having a pore size of approximately 350 microns. The thickness of the entire plate is about 1⅛ inches. The porous plate produces a more even pattern of air distribution, relatively larger air bubbles, and the pressure drop is comparable to the uniform-porosity plate.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. A system for supporting granular filter media comprising:
    a filter comprising a filter bottom, underdrain blocks adjacent the filter bottom and filter media;
    a rigid porous plate positioned over the underdrain blocks to support the filter media;
    wherein the porous plate includes integral layers of different pore size.

2. The filter media support system of claim 1 wherein the porous plate includes a relatively coarse pore size layer adjacent the filter bottom and a relatively fine pore size layer above the coarse pore size layer.

3. The filter media support system of claim 2 wherein the porous plate further includes a relatively coarse pore size layer above the fine pore size layer.

4. The filter media support system of claim 3 wherein the coarse layers have a pore size of from 500 to 5000 microns and the fine layer has a pore size of from 150 to 1500 microns.

5. The filter media support system of claim 2 wherein the coarse layer has a pore size of from 500 to 5000 microns and the fine layer has a pore size of from 150 to 1500 microns.

6. The filter media support system of claim 1 wherein the porous plate is made of a material selected from the group consisting of ceramics, metals and polymers.

7. The filter media support system of claim 1 wherein the porous plate includes lap joints between adjacent sections.

8. A system for supporting granular filter media comprising:
    a filter comprising a filter bottom, an infrastructure comprising air laterals, underdrain blocks adjacent the filter bottom and filter media;
    a rigid porous plate positioned over the underdrain blocks to support the filter media, the porous plate comprising integral layers of different pore size, the porous plate anchored to the air laterals beneath the underdrain blocks.

9. The filter media support system of claim 8 wherein the porous plate comprises sintered polyethylene.

10. A filter system for supporting granular fluid treatment media comprising:
    a filter comprising a filter bottom, the filter bottom comprising infrastructure;
    a layer of underdrain blocks placed over infrastructure of the filter bottom;
    a rigid porous plate placed over the underdrain blocks adapted to support the granular fluid treatment media, the porous plate including integral layers of different pore size;
    anchors extending from the porous plate through the layer of underdrain blocks securing the porous plate to the infrastructure.

11. A filter system for supporting granular fluid treatment media comprising:
    a filter comprising a filter bottom, the filter bottom comprising infrastructure;
    a layer of underdrain blocks placed over infrastructure of the filter bottom;
    a rigid porous plate placed over the underdrain blocks adapted to support the granular fluid treatment media, the porous plate including integral layers of different pore size;
    anchors extending from the porous plate through the layer of underdrain blocks securing the porous plate to the infrastructure; and
    the infrastructure comprising a plurality of air laterals running under the underdrain blocks, and anchors secured to the air laterals.

12. The filter media support system of claim 11 wherein the underdrain blocks are arranged end-to-end in rows over the air laterals, the porous plate has a larger horizontal dimension than the individual underdrain blocks so that the porous plate covers a plurality of the underdrain blocks, and the anchors extend between adjacent ends of the blocks.

13. The filter media support system of claim 12 wherein upper ends of the anchors are secured to bars positioned over the porous plate running transversely to the rows of the underdrain blocks.

14. The filter media support system of claim 12 wherein the porous plate includes lap joints parallel to the rows of underdrain blocks.

15. The filter media support system of claim 14 wherein the anchors pass through a bore formed through an overlap of the joint between adjacent porous plate sections.

16. The filter media support system of claim 12 wherein the sides of adjacent underdrain blocks are interconnected by lugs.

\* \* \* \* \*